United States Patent
Sano et al.

(10) Patent No.: US 8,369,015 B2
(45) Date of Patent: Feb. 5, 2013

(54) OPTICAL ELEMENT AND OPTICAL APPARATUS

(75) Inventors: Daisuke Sano, Utsunomiya (JP); Yutaka Yamaguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 12/560,720

(22) Filed: Sep. 16, 2009

(65) Prior Publication Data

US 2010/0067111 A1    Mar. 18, 2010

(30) Foreign Application Priority Data

Sep. 17, 2008    (JP) .................................. 2008-237288

(51) Int. Cl.
*G02B 5/30* (2006.01)
*G02B 27/28* (2006.01)

(52) U.S. Cl. .......... 359/489.11; 359/489.12; 359/489.13

(58) Field of Classification Search ........................ None
See application file for complete search history.

(56) References Cited

U.S. PATENT DOCUMENTS

| 2004/0047388 A1* | 3/2004 | Wang et al. ...................... 372/92 |
| 2004/0095637 A1* | 5/2004 | Nikolov et al. ................ 359/352 |
| 2005/0045799 A1* | 3/2005 | Deng et al. ..................... 250/200 |
| 2009/0296214 A1* | 12/2009 | Sano et al. ..................... 359/497 |

FOREIGN PATENT DOCUMENTS

| EP | 1783520 A2 | 5/2007 |
| JP | 2004-139001 A | 5/2004 |
| JP | 2007-156441 A | 6/2007 |

* cited by examiner

*Primary Examiner* — Lee Fineman
(74) *Attorney, Agent, or Firm* — Carter, DeLuca, Farrell & Schmidt LLP

(57) ABSTRACT

An optical element includes an optical anisotropic medium. A difference between a minimum refractive index $n_l$ and a maximum refractive index $n_h$ of the optical anisotropic medium at a used central wavelength is at least 0.1, and a refractive index $n_{t1}$ of a first medium optically adjacent to the optical anisotropic medium at the used central wavelength satisfies the following condition:

$$(n_{t1}-n_l)\cdot(n_{t1}-n_h)\leq 0.$$

15 Claims, 11 Drawing Sheets

X DIRECTION

Y DIRECTION

X DIRECTION

Y DIRECTION

X DIRECTION    Y DIRECTION

OPTICAL ELEMENT AND OPTICAL APPARATUS

BACKGROUND OF THE INVENTION

1. Field of the Invention

The present invention relates to an optical element using an optical anisotropic medium, and an optical apparatus such as a projector which uses the optical element.

2. Description of the Related Art

The optical element that uses the optical anisotropy has been in wide use for polarization control, beam separation, or the like. For example, the optical element is used as a phase plate represented by a λ/4 plate or a λ/2 plate, a polarization plate represented by a polarization separation element, or an optical low-pass filter.

The optical anisotropy means a nature of variance of refractive indexes depending on a vibration direction of an incident polarized light. The use of this nature enables variance of behaviors depending on polarization directions even in the case of lights entering from the same direction.

Materials having such optical anisotropy include a crystal material such as a crystal or a limestone, a liquid crystal material, and an organic material such as plastic or a high molecule. A degree of optical anisotropy of such a material is represented by a refractive index with respect to a polarization direction.

Japanese Patent Laid-Open Nos. 2004-139001 and 2007-156441 disclose, as a method for obtaining optical anisotropy, methods which use structural anisotropy based on structures smaller than a wavelength of a used light (hereinafter referred to as a used wavelength).

In the structure smaller than the used wavelength, a light is known to behave like a homogeneous medium without being able to directly recognize the structure. In this case, the light exhibits a refractive index compliant with a filling rate. The refractive index can be obtained by a method called an effective refractive index method. A nature of variance of refractive indexes depending on polarization directions according to the filling rate of the structure is called structural anisotropy. Optionally setting a filling rate of the structure enables adjustment of a refractive index. The use of structural anisotropy enables an increase of a difference of refractive indexes depending on polarization directions as compared with a normal optical anisotropic material. Thus, a thickness for obtaining desired birefringence characteristics can be reduced.

Japanese Patent Laid-Open No. 2004-139001 discloses a phase plate which uses structural anisotropy. In the phase plate, by using the capability of the structural anisotropy to adjust the refractive index, a plurality of structural anisotropic layers (periodic structures) are combined to suppress changes in phase difference characteristics caused by wavelengths.

Japanese Patent Laid-Open No. 2007-156441 discloses an optical element which includes a structural anisotropic layer of a plane normal direction formed in one surface of a substrate, and a structural anisotropic layer of an in-plane direction in the other surface. A phase compensation plate is obtained by adjusting a refractive index based on the structural anisotropy of each surface and combining the refractive indexes. An antireflection coating is inserted to provide an antireflective function.

Japanese Patent Laid-Open No. 2004-139001 discloses an example where a material of a low refractive index having similar periodicity is disposed on a structural anisotropic layer using a medium of a high refractive index. Thus, since the material of a refractive index lower than that of each structural anisotropic layer is stacked thereon, reflection on the surface is suppressed to a certain extent. With this configuration, however, antireflective performance is insufficient.

In Japanese Patent Laid-Open No. 2007-156441, an antireflection coating is provided to a structural anisotropic layer. However, no configuration necessary for exhibiting an antireflective function is disclosed.

When the material of large refractive index variance depending on polarization directions is used, reflection-transmission characteristics greatly vary with respect to the polarization directions. Even when antireflective coating is provided, because of the large variance of refractive indexes, optimization of characteristics for each polarization direction is difficult.

BRIEF SUMMARY OF THE INVENTION

The present invention provides an optical element which uses optical anisotropy and exhibits sufficient antireflective performance, and an optical apparatus which uses the optical element.

An optical element as one aspect of the present invention includes an optical anisotropic medium. A difference between a minimum refractive index $n_l$ and a maximum refractive index $n_h$ of the optical anisotropic medium at a used central wavelength is at least 0.1. A refractive index $n_{t1}$ of a first medium optically adjacent to the optical anisotropic medium at the used central wavelength satisfies the following condition:

$$(n_{t1}-n_l)\cdot(n_{t1}-n_h) \leq 0.$$

An optical element as another aspect of the present invention includes an optical anisotropic medium. A difference between a minimum refractive index $n_l$ and a maximum refractive index $n_h$ of the optical anisotropic medium at a used central wavelength is at least 0.1. The following conditions are satisfied:

$$0 \leq n_{o1} \cdot d_{o1} \leq \frac{\lambda}{6}$$

$$(n_{d1} - n_l) \cdot (n_{d1} - n_h) \leq 0$$

where $n_{d1}$ is a refractive index of a first medium optically adjacent to the optical anisotropic medium at the used central wavelength, $n_{o1}$ is a refractive index of a third medium disposed between the optical anisotropic medium and the first medium at the used central wavelength, and $d_{o1}$ is a thickness of the third medium.

An optical apparatus including the above optical element also constitutes another aspect of the present invention.

Further features of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Figure 1:
FIG. 1 is a sectional view showing a basic configuration of an optical element which is an embodiment of the present invention.

First, features common among optical elements of embodiments will be described before description of specific embodiments. FIG. 1 illustrates a basic configuration example of an optical element.

Reference numeral 011 denotes a medium having optical anisotropy (an optical anisotropic medium: hereinafter referred to as an optical anisotropic layer). Reference numeral 012 denotes a medium which is formed as a thin film having homogeneous isotropy and is optically adjacent to the optical anisotropic layer 011 (hereinafter referred to as a thin film layer). Reference numeral 013 denotes a medium which is formed as a thin film having homogeneous isotropy and is optically adjacent to the optical anisotropic layer 011 at an interface different from that of the thin film 012 (hereinafter referred to as a thin film layer).

The phrase "optically adjacent" includes not only a case where the optical anisotropic layer 011 and the thin film layer 012 or 013 come into contact with each other (mechanically adjacent) at one interface as shown in FIG. 1, but also a case where an insertion layer extremely thinner than each of the layers and having limited optical influence is held among the layers. In the description below, optically adjacent may also be simply referred to as adjacent.

Reference numeral 014 denotes a base member (hereinafter referred to as a substrate) such as a lens. Reference numeral 015 denotes an antireflective layer (an antireflection coating) which includes the optical anisotropic layer 011 and the thin film layers 012 and 013.

In the configuration shown in FIG. 1, one of the thin film layers 012 and 013 corresponds to a first medium and the other corresponds to a second medium. However, the thin film layer 013 can be excluded, and in this case the medium adjacent to the optical anisotropic layer 011 is the substrate 014.

In the description below, a refractive index means a refractive index at a central wavelength (used central wavelength) λ in a wavelength band of used light (used wavelength).

In the present embodiment, the optical anisotropic layer 011 is a uniaxial optical anisotropic material having an optical axis in a y-axis direction. A refractive index of the optical anisotropic layer 011 with respect to light vibrating in x and z directions (first polarized light) is defined as $n_h$, and a reflective index of the optical anisotropic layer 011 with respect to light vibrating in a y direction (second polarized light) is defined as $n_l$ ($n_l<n_h$). The refractive indexes $n_h$ and $n_l$ are a maximum refractive index and a minimum refractive index, respectively. Although the case where the optical anisotropic layer 011 is made of the uniaxial optical anisotropic material is described in the embodiment, it can also be made of a biaxial optical anisotropic material.

In the embodiment, the difference between $n_h$ and $n_l$ is equal to or greater than 0.1. Satisfying this condition enables the thickness of the optical anisotropic layer 011 for obtaining desired birefringence characteristics to be reduced. Thus, because the thickness of the optical anisotropic layer 011 is sufficiently reduced, the optical anisotropic layer 011 can function as an interference layer. If the difference between $n_h$ and $n_l$ is smaller than 0.1, the optical anisotropic layer 011 needs to have an extremely large thickness for obtaining the desired birefringence characteristics because the refractive index difference for each polarized light is small, and it is not preferable.

Figure 2A:
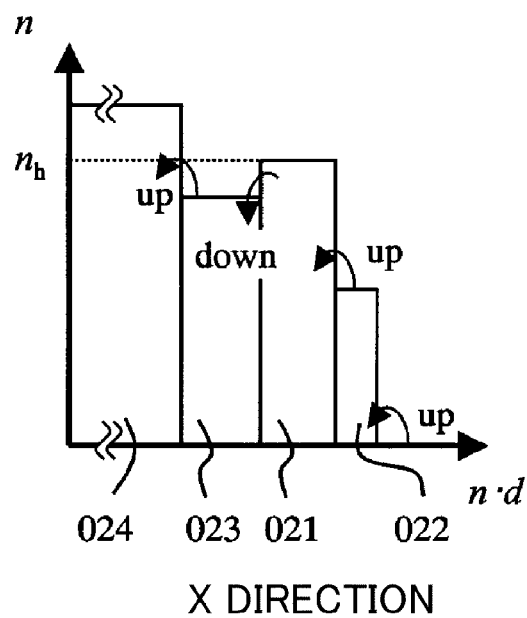
FIGS. 2A and 2B are views each showing a refractive index structure of an optical element of the embodiment.
Figure 2B:
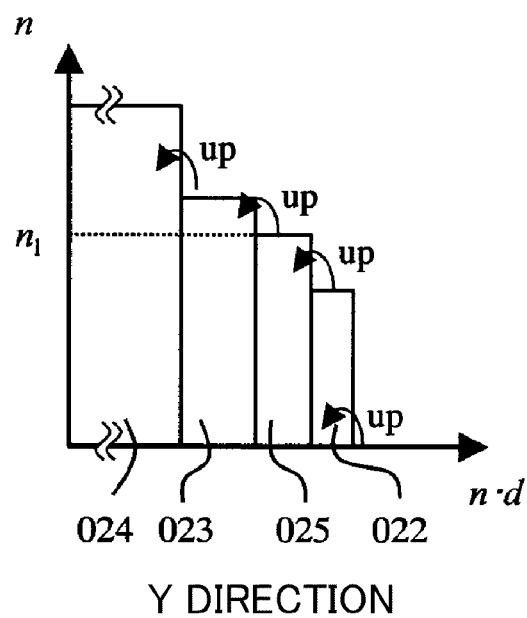

FIGS. 2A and 2B show a refractive index structure of the configuration shown in FIG. 1. In FIGS. 2A and 2B, a horizontal axis indicates an optical film thickness and a vertical axis indicates a refractive index. Light enters the optical element from the right side of the drawing.

Reference numerals 021 and 025 denote a refractive index n and an optical film thickness n·d of the optical anisotropic layer 011 in an x direction (FIG. 2A) and in a y direction (FIG. 2B), respectively. The terms "up" and "down" in FIGS. 2A and 2B indicate "increase" and "decrease" of refractive index changes at an interface between the layers when seen from the opposite side of the substrate 014 (light incident side).

Reference numeral 022 denotes a refractive index and an optical film thickness of the thin film layer 012 in x and y directions, and reference numeral 023 denotes a refractive index and an optical film thickness of the thin film layer 013 in x and y directions. Further, reference numeral 024 denotes a refractive index and an optical film thickness of the substrate 014 in x and y directions.

Because each of the thin film layers 012 and 013 and the substrate 014 is an isotropic medium, its refractive index is constant with the direction. On the other hand, the optical anisotropic layer 011 has refractive indexes different from each other in x and y directions. Therefore, as a whole, a refractive index structure which has refractive indexes different from each other in the x and y directions can be obtained.

The optical film thickness of the optical anisotropic layer 011 also differs according to the ratio of the refractive indexes in the x and y directions.

In a conventional antireflection technology, light entering a substrate is reflected on a plurality of interfaces and the reflected lights which are considered as waves interfere with one another to obtain an antireflection function. Hereinafter, a method for making reflected lights interfere with one another in the conventional antireflection technology will be briefly described.

Figure 3:
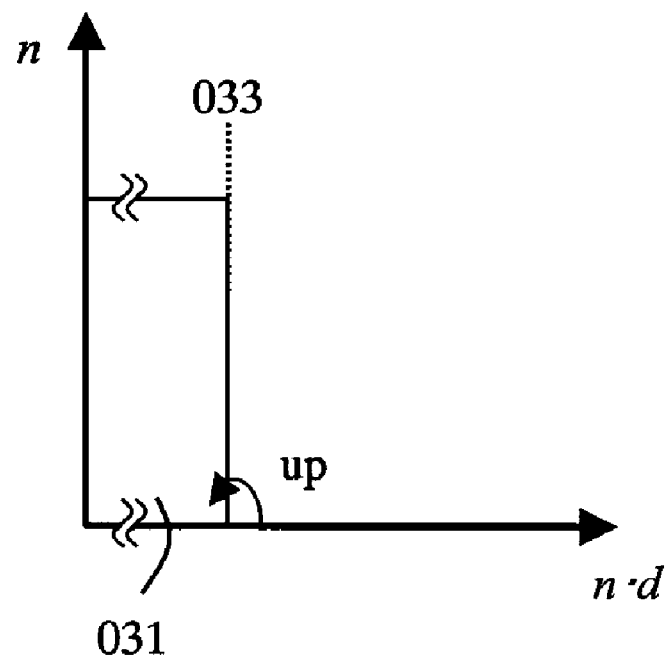
FIG. 3 is a view showing a refractive index structure of only a substrate of the optical element.
Figure 16:
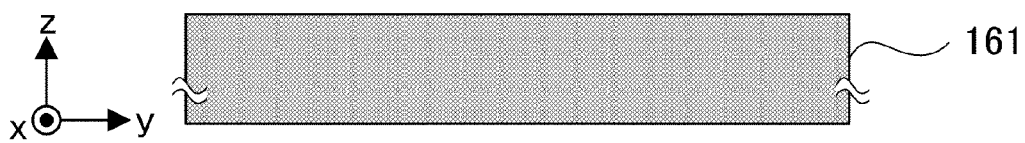
FIG. 16 is a sectional view showing an optical element which includes only a substrate.

First, an optical element that includes only a substrate will be considered. FIG. 16 shows a configuration example of the optical element. Reference numeral 161 denotes a substrate made of an isotropic medium. FIG. 3 shows a refractive index structure of the substrate 161. Reference numeral 031 denotes a refractive index of the substrate 161, and reference numeral 033 denotes an interface between the substrate 161 and a medium (incident medium) in which incident light proceeds to the substrate 161. The incident light is reflected on the interface 033, and the amplitude of the wave of the reflected light is obtained from the refractive index difference between the incident medium and the substrate 161. The amplitude is represented by Fresnel coefficient, and it shows a negative value when the refractive index change at the interface 033 is a refractive index increase seen from the incident side and a positive value when the change is a refractive index decrease. This indicates a phase change amount of light reflected on the interface 033.

Figure 4:
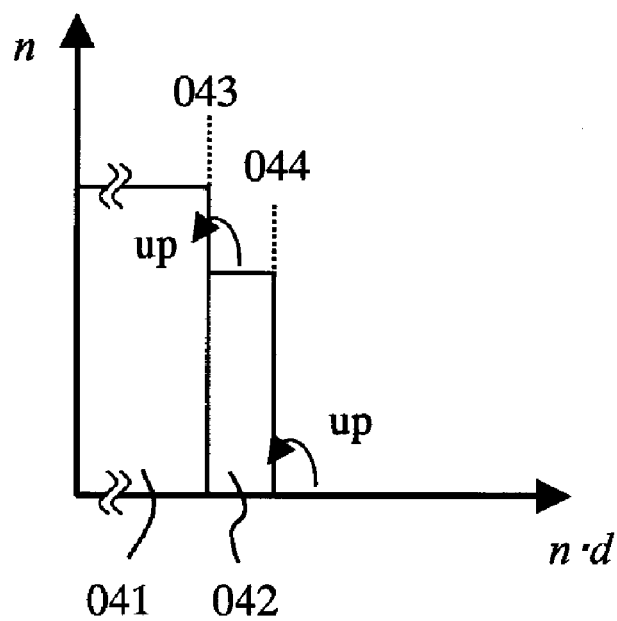
FIG. 4 is a view showing a refractive index structure when a thin film of a lower refractive index is formed on the substrate.
Figure 5:
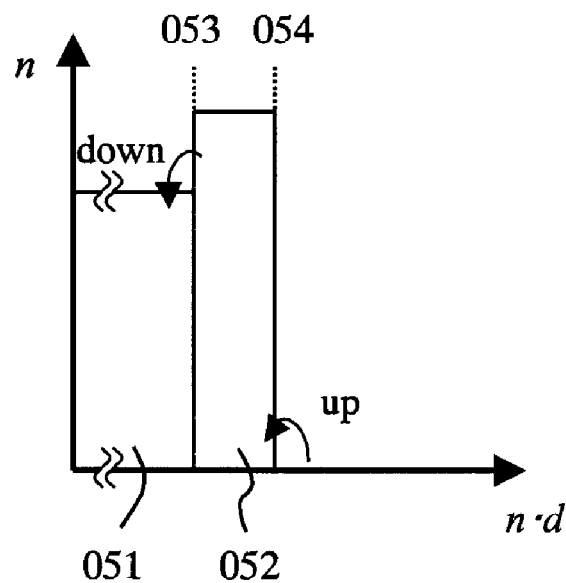
FIG. 5 is a view showing a refractive index structure when a thin film of a higher refractive index is formed on the substrate.
Figure 17:
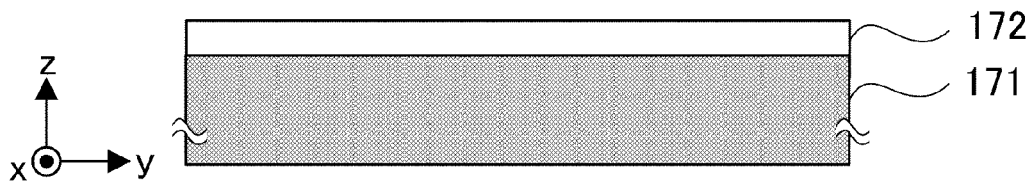
FIG. 17 is a sectional view showing an optical element which includes a thin film formed on a substrate.

FIG. 17 shows a configuration example where a single antireflective layer is disposed on the substrate 161 of FIG. 16. Reference numeral 171 denotes a substrate, and reference numeral 172 denotes a thin film layer as an antireflective layer. FIGS. 4 and 5 show a refractive index structure of this optical element. Reference numerals 041 and 051 denote a refractive index and an optical film thickness of the substrate 171 and reference numerals 042 and 052 denote a refractive index and an optical film thickness of the thin film layer 172. Reference numeral 043 denotes an interface between the substrate 171 and the thin film layer 172, and reference numeral 044 denotes an interface between an incident medium and the thin film layer 172. Further, reference numeral 053 denotes an interface between the substrate 171 and the thin film layer 172, and reference numeral 054 denotes an interface between the incident medium and the thin film layer 172.

FIG. 4 shows a configuration example where a thin film layer having a refractive index intermediate between those of the substrate and the incident medium (intermediate refractive index) is inserted between the substrate 171 and the incident medium. Reflection of light in the refractive index structure is overlapping of reflected lights on the interfaces 043 and 044. The overlapped state is determined by an optical film thickness of the thin film layer 172.

As shown in FIG. 4, when the refractive indexes on both interfaces 043 and 044 of the thin film layer 172 are changed to increase, the changes of the wave phases of the lights reflected on the both interfaces 043 and 044 are similar to each other. These waves are cancelled on condition that the optical film thickness is $\lambda/4$, and these waves are reinforced on condition that the optical film thickness is $\lambda/2$. In the latter case, it has the same force as that of the reflected light on the interface 033 in FIG. 3.

Although FIG. 4 shows the case where the refractive indexes at both interfaces 043 and 044 of the thin film layer 172 are changed to increase, the same applies when refractive indexes at both interfaces are changed to decrease.

In the case of the configuration of FIG. 4, based on law of conservation of energy, the amplitude of reflected light on each interface is not larger than that of reflected light on the interface 033 of FIG. 3. In view of wave interferences, only an amount of reflected light equal to that of reflected light in FIG. 3 is generated even under the reinforcing condition of the waves. Thus, a total amount of reflected wave in the configuration of FIG. 4 is smaller than that in the configuration of FIG. 3. In other words, the thin film layer where refractive index change directions are similar between both interfaces becomes a layer for "decreasing the amount of reflected light".

FIG. 5 shows a configuration example where a thin film layer having a refractive index higher than the refractive indexes of the substrate 171 and the incident medium is inserted between the substrate 171 and the incident medium.

Reflection of light in this configuration is overlapping of reflection on the interface 053 and reflection on the interface 054. This overlapping method is determined by an optical film thickness of the thin film layer 172.

When refractive index changes at both interfaces 053 and 054 of the thin film layer 172 are different like an increase and a decrease, phase changes of waves of lights reflected on both interfaces 053 and 054 are reverse. A condition for canceling waves with each other is an optical film thickness of $\lambda/2$, and a reinforcing condition is an optical film thickness of $\lambda/4$. In the former case, reflected light of intensity equal to that of the reflected light on the interface 033 of FIG. 3 is generated. In this example, the case where the refractive index changes at both the interfaces are the increase and the decrease is described. The same applies when the refractive index changes at both interfaces are a decrease and an increase.

In this configuration, amplitude of a reflected light on each interface is larger than that of the reflected light on the interface 033 of FIG. 3. In view of wave interferences, an amount of reflected light equal to that of reflected light in FIG. 3 is generated even under the reinforcing condition of the waves. Thus, a total amount of reflected wave in the configuration of FIG. 5 is larger than that in the configuration of FIG. 3. In other words, the thin film layer where refractive index change directions are different between both interfaces becomes a layer for "increasing the amount of reflected light".

An antireflective layer is formed by combining the two types of thin film layers in many cases. The simple use of the former configuration leads to a reduction in amount of reflected light. However, a material usable as an antireflective layer is discrete and selective, and a high-performance antireflective function is accordingly difficult to be obtained only by the former configuration. Thus, combining the former configuration with the latter configuration enables adjustment of intensity of a partial reflected light, thereby decreasing intensity of the reflected light by the former case. As a result, a high-performance antireflective layer (antireflection coating) is obtained.

As described above, in view of wave interferences, the optical film thicknesses of $\lambda/4$ and $\lambda/2$ have opposite characteristics. The optical film thickness of "$\lambda/4$" can also be represented by $(2m-1)\lambda/4$ (i.e. same characteristics are obtained) where m is a natural number (m=1, 2, 3, . . . ), and the optical film thickness of "$\lambda/2$" can also be represented by $m\lambda/2$ or $(2m-1)\lambda/2$.

Based on this theory, to reduce a reflected light for each thin film layer, advisably, an optical film thickness of the thin film layer is set to a film thickness corresponding to a refractive index change at an interface between both sides of the thin film layer. For example, when two thin film layers of refractive indexes sequentially lower with respect to a refractive index of the substrate are stacked, refractive index changes at the interfaces of the thin film layer are all positive (increase). Therefore, it is preferable that the optical film thickness of these thin film layers is set to λ/4. Strictly, intensity of a reflected light obtained from a refractive index difference between the interfaces has to be taken into consideration. But the description is omitted.

When the refractive index structure of the optical element shown in FIGS. 2A and 2B is taken into consideration based on the theory, the optical film thicknesses 021 and 025 of the optical anisotropic layer 011 are different between the x and y directions. It is because a difference in refractive indexes between the directions causes a difference in optical film thickness between the directions even while a physical film thickness is constant. In the case of such an optical element, for example the case of the λ/4 plate, the difference between the optical film thicknesses of both polarizations is λ/4. Therefore, the optical film thicknesses are λ/4 and λ/2 in a polarization direction, resulting in layers of opposite characteristics in the antireflective structure described above.

Figure 18A:
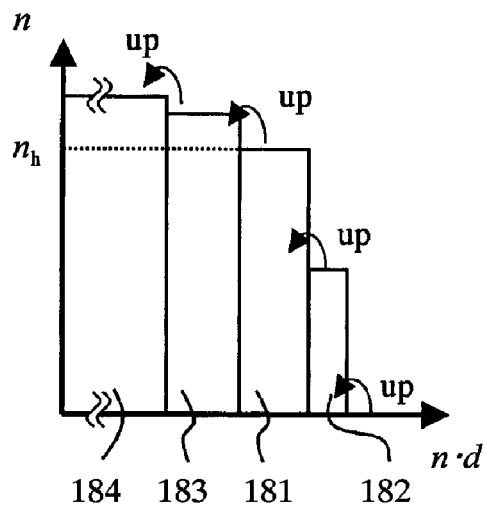
FIGS. 18A and 18B are views each showing a refractive index structure of an optical element which includes an optical anisotropic layer and a thin film stacked on a substrate.
Figure 18B:
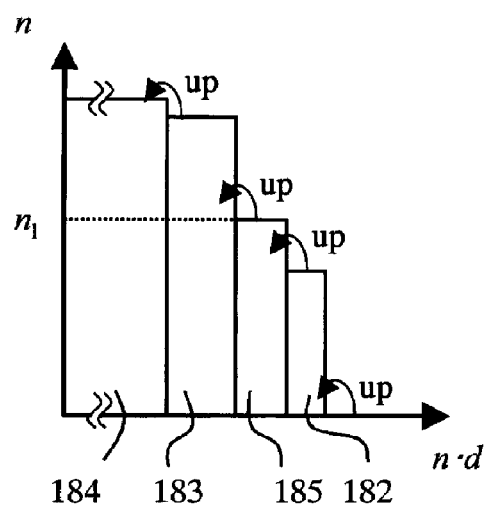

FIGS. 18A and 18B show a refractive index structure in this case. Reference numerals 181 and 185 denote refractive indexes ($n_h$, $n_l$) and optical film thicknesses in the x and y directions of the optical anisotropic layer 011, and reference numeral 182 denotes equal refractive indexes and optical film thicknesses of the thin film layer 012 in the x and y directions. Reference numeral 183 denotes equal refractive indexes and optical film thicknesses of the thin film layer 013 in the x and y directions. Reference numeral 184 denotes equal refractive indexes and optical film thicknesses of the substrate 014 in the x and y directions.

The optical film thickness 181 of the optical anisotropic layer 011 in the x direction is 3λ/4, and the optical film thickness 185 in the y direction is λ/2. The refractive index 182 of the thin film layer 012 is smaller than refractive indexes 181 ($n_h$) and 185 ($n_l$) of the optical anisotropic layer 011, and the refractive index 183 of the thin film layer 013 is set to an intermediate value between the refractive index 184 of the substrate 014 and the refractive index 181 ($n_l$) of the optical anisotropic layer 011.

In the configuration of the x direction, because refractive index changes of the refractive index 181 of the optical anisotropic layer 011 on both interfaces are similar to each other, the optical film thickness of 3λ/4 is suited as an antireflective layer. In other words, since the configuration is ideal in all the layers (films), antireflective performance is greatly improved.

In the configuration of the y direction, because refractive index changes of the refractive index 185 of the optical anisotropic layer 011 on both interfaces are similar to each other, the optical film thickness of λ/2 is not suited for antireflection.

Thus, when refractive indexes 182 and 183 of the thin film layers 012 and 013 adjacent to the optical anisotropic layer 011 are not intermediate between the refractive indexes 181 and 185 of the optical anisotropic layer 011, the optical film thickness can not be optimally constituted in both x and y directions.

In the embodiment, a minimum refractive index $n_l$ and a maximum refractive index $n_h$ of the optical anisotropic layer 011 and a refractive index $n_{t1}$ of one (first medium) of the thin film layers 012 and 013 optically adjacent to the optical anisotropic layer 011 satisfy the following condition represented by expression (1).

$$(n_{t1}-n_l)\cdot(n_{t1}-n_h) \leq 0 \quad (1)$$

In FIGS. 1, 2A, and 2B, the optical anisotropic layer 011 is adjacent to the thin film layers 012 and 013. In the embodiment, a refractive index 023 of the thin film layer (first medium) 013 is $n_{t1}$, and refractive indexes 021 and 025 of the optical anisotropic layer 011 are $n_h$ and $n_l$, respectively. The expression (1) means that the refractive index $n_{t1}$ is a value between the refractive indexes $n_h$ and $n_l$ (intermediate value).

When the expression (1) is satisfied, as shown in FIGS. 2A and 2B, the refractive index changes at an interface between the optical anisotropic layer 011 and the thin film layer 013 differ in the x and y directions. Because the optical film thickness for each polarized light is drastically changed in an optical anisotropic medium which has a large refractive index difference, a proper antireflection performance for both polarized lights can be obtained by the refractive index changes differing in the x and y directions.

On the other hand, when the expression (1) is not satisfied, the refractive index changes for both polarized lights at an interface between the optical anisotropic layer 011 and the thin film layer 013 are similar to each other. Therefore, the antireflection performance for each polarized light is widely different and it is not preferable.

In the embodiment, a refractive index $n_{t2}$ of a second medium adjacent to the optical anisotropic layer at an interface different from that of the first medium having a refractive index $n_{t1}$ preferably satisfies the following condition represented by expression (2).

$$(n_{t2}-n_l)\cdot(n_{t2}-n_h) \geq 0 \quad (2)$$

A refractive index 022 of the thin film layer (second medium) is defined as $n_{t2}$. The expression (2) indicates that the refractive index $n_{t2}$ is equal to or less than the refractive indexes $n_l$ and $n_h$ or is equal to or greater than the refractive indexes $n_l$ and $n_h$. In FIGS. 2A and 2B, the former case is described as an example. As shown in FIGS. 2A and 2B, satisfying the expression (2) causes the refractive index changes at an interface between the optical anisotropic layer 011 and the thin film layer 012 to be similar in the x and y directions. Thus, the refractive index of the optical anisotropic layer 011 is configured to be a layer for "decreasing the amount of reflected light" and a layer for "increasing the amount of reflected light" in accordance with the directions. In an optical anisotropic medium having a large refractive index difference, because an optical film thickness is widely different for both polarized lights, the film thickness difference can be canceled by changing the configuration of the refractive index as described above.

In the embodiment, a refractive index which satisfies the following condition represented as expression (3) with respect to the refractive indexes $n_{t1}$ and $n_{t2}$ among the minimum refractive index $n_l$ and the maximum refractive index $n_h$ of the optical anisotropic layer 011 is n.

$$(n-n_{t1})\cdot(n_{t2}-n) \leq 0 \quad (3)$$

When a thickness of the optical anisotropic layer 011 is d, the following condition represented as expression (4) is preferably satisfied.

$$0.7m \cdot \frac{\lambda}{2} \leq n \cdot d \leq 1.3m \cdot \frac{\lambda}{2} \quad (4)$$

In the expression (4), λ is a used central wavelength, and m is a natural number.

The expression (3) indicates a refractive index in a direction where the refractive index changes on both interfaces are different from each other among the refractive indexes of the optical anisotropic layer 011. Referring to FIGS. 2A and 2B, this will be described. In FIGS. 2A and 2B, the refractive index increases from the thin film layer 012 to the optical anisotropic layer 011 and decreases from the optical anisotropic layer 011 to the thin film layer 013 in an x direction. Therefore, when a refractive index 021 ($n_h$) is defined as n, the condition represented by the expression (3) is satisfied.

The refractive index increases from the thin film layer 012 to the optical anisotropic layer 011 and also increases from the optical anisotropic layer 011 to the thin film layer 013 in a y direction. Therefore, a refractive index 025 ($n_l$) does not satisfy the condition represented by the expression (3). Thus, the refractive index 021 in the x direction satisfies the expression (3).

The condition represented by the expression (4) shows that an integrated value of a refractive index in a polarization direction satisfying the expression (3) and a film thickness is in a certain range. In FIGS. 2A and 2B, as described above, the x direction satisfies the expression (3). Therefore, the integrated value of the refractive index 021 and the film thickness of the optical anisotropic layer 011 satisfy the expression (4).

When the expression (4) is satisfied, the refractive index 021 of the optical anisotropic layer 011 is a suitable value in the x direction. On the other hand, directional properties of the refractive index changes in the optical anisotropic layer 011 are different in the y direction. As shown in FIGS. 2A and 2B, when a refractive index increases at both interfaces, the refractive index differences between the optical anisotropic layer 011 and the thin film layers 012 and 013 which hold the optical anisotropic layer 011 are necessarily small. Therefore, even when the film thickness is not a suitable value, the variance of the refractive index is small. In other words, a good antireflection performance in the x and y directions can be obtained.

The configuration where the expression (3) is satisfied in both the x and y directions can also be possible. In this case, when the expression (3) is satisfied in both the x and y directions, a good antireflection performance in the x and y directions can be obtained.

The refractive index structure as described above is effective for all optical elements which include a medium having a strong optical anisotropy. For example, when a λ/4 plate is used, the optical film thickness difference for each polarized light is λ/4. In other words, when the optical film thickness of one of the thin film layers 012 and 013 is set to be λ/2, the optical film thickness of the other layer is λ/4. Thus, antireflective functions of the thin film layers 012 and 013 have characteristics exactly opposite to each other in accordance with a polarization direction. However, as described in the embodiment, setting polarization so that one of the optical film thicknesses of the thin film layers 012 and 013 can be set to λ/2 enables balancing between polarization of an optical film thickness of λ/4 and reflection-transmission characteristics.

When the present invention is applied to an optical element which uses an optical anisotropic medium other than the λ/4 plate, an optical film thickness difference has less influence on antireflective performance as compared with the λ/4 plate. Thus, in all the optical elements using optical anisotropic media, reflection-transmission characteristics can be improved with respect to both polarized lights.

Further, in the embodiment, a thin film layer (hereinafter, referred to as an insertion layer) as a third medium may be provided between the optical anisotropic layer and the first medium adjacent to the optical anisotropic layer. In this case, when a refractive index of the first medium adjacent to the optical anisotropic layer is $n_{d1}$, a refractive index of the insertion layer is $n_{o1}$, and a film thickness of the insertion layer is $d_{o1}$, the following condition represented by expression (5) is preferably satisfied.

$$0 \le n_{o1} \cdot d_{o1} \le \frac{\lambda}{6} \tag{5}$$

$$(n_{d1} - n_1) \cdot (n_{d1} - n_h) \le 0$$

Figure 19:
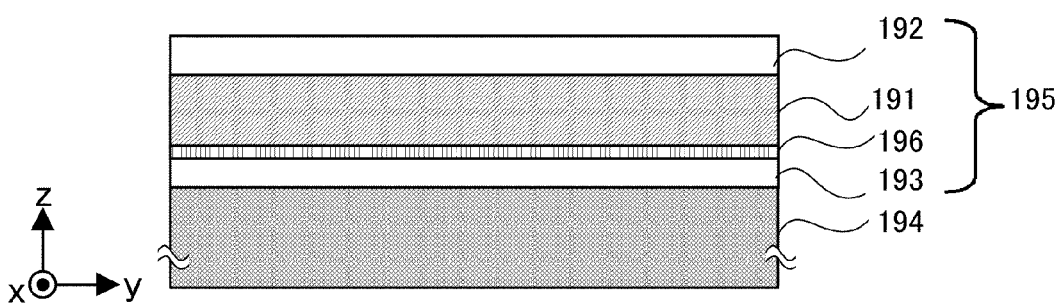
FIG. 19 is a sectional view showing an optical element of an embodiment where an insertion layer is added to the basic configuration of FIG. 1.
Figure 20A:
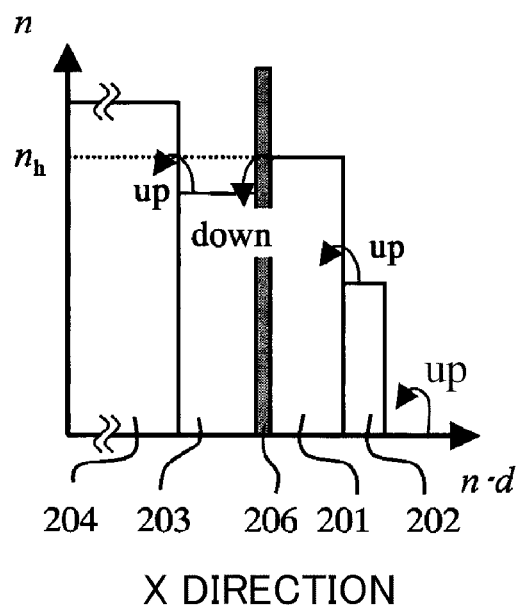
FIGS. 20A and 20B are views each showing a refractive index structure of the optical element of FIG. 19.
Figure 20B:
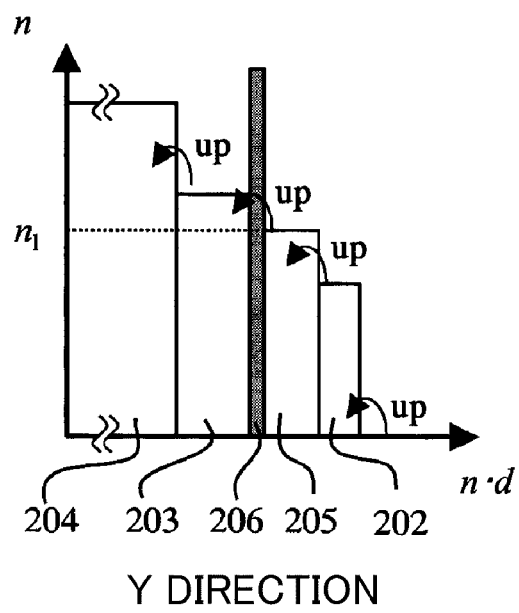

FIG. 19 shows a configuration example of an optical element which satisfies the expression (5). Reference numeral 191 denotes an optical anisotropic layer, and reference numerals 192, 193, and 196 denote thin film layers which are made of a homogeneous isotropic thin film. The thin film layer 196 among the layers is a thin film layer (insertion layer) as a third medium. Reference numeral 194 denotes a substrate, and reference numeral 195 denotes an antireflection coating which is constituted by the optical anisotropic layer 191 and the thin film layers 192, 193, and 196. FIGS. 20A and 20B show the refractive index structure of the optical element of FIG. 19. Reference numerals 201 and 205 denote refractive indexes n and optical film thicknesses n·d in the x and y directions of the optical anisotropic layer 191 in the x and y directions, respectively. Reference numeral 202 denotes a refractive index and an optical film thickness in the x and y directions of the thin film layer 192, and reference numeral 203 denotes a refractive index and an optical film thickness in the x and y directions of the thin film layer 193. Reference numeral 204 denotes a refractive index and an optical film thickness in the and y directions of the substrate 194, and reference numeral 206 denotes a refractive index and an optical film thickness in the x and y directions of the insertion layer 196.

When the refractive index of the insertion layer 196 is equal to or greater than $n_h$, the optical element shown in FIG. 19 does not satisfy the condition described above. However, because the insertion layer 196 has a thin optical film thickness, the influence on the optical characteristics is small. Therefore, even if the insertion layer 196 is provided, the thin film layer 193 and the optical anisotropic layer 191 can be considered as optically adjacent to each other. In other words, even if an insertion layer which satisfies a first condition of the expression (5) described above or a first condition of expression (6) described later is held, two layers (including the substrate) on both sides of the insertion layer are considered as optically adjacent to each other. A hard coating layer, an anti-glare layer, an adhesive layer, or the like can be used as the insertion layer 196.

The optical film thickness of the insertion layer 196 is preferably set to be equal to or lower than λ/8, and is more preferably set to be equal to or lower than λ/10.

In the embodiment, although it is not shown, a thin film layer as a fourth medium (hereinafter, referred to as an insertion layer) may be provided between the optical anisotropic layer 191 and the thin film layer (second medium) 192. In this case, when a refractive index of the thin film layer 192 is $n_{d2}$, and a refractive index and a thickness of the insertion layer as a fourth medium are $n_{o2}$ and $d_{o2}$ respectively, the following condition represented by expressions (6) is preferably satisfied.

$$0 \le n_{o2} \cdot d_{o2} \le \frac{\lambda}{6} \tag{6}$$

$$(n_{d2} - n_1) \cdot (n_{d2} - n_h) \ge 0$$

In this case, a refractive index which satisfies the following condition represented by expression (7) with respect to the refractive indexes nd1 and nd2 of the two thin film layers among the minimum refractive index nl and the maximum refractive index nh of the optical anisotropic layer 091 is defined as n.

$$(n-n_{d1})\cdot(n_{d2}-n) \leq 0 \qquad (7)$$

When the thickness of the optical anisotropic layer 191 is d, the following condition represented by expression (8) is preferably satisfied.

$$0.7m \cdot \frac{\lambda}{2} \leq n \cdot d \leq 1.3m \cdot \frac{\lambda}{2} \qquad (8)$$

In the expression (8), m is a natural number.

In the embodiment, the optical anisotropic layer may be a layer provided with structural anisotropy realized by forming a plurality of structures smaller than the used central wavelength λ (preferably, smaller than the shortest wavelength among lights in the used wavelength range). The layer may be a layer having a periodic structure whose period is shorter than the used central wavelength λ (preferably, the shortest wavelength among lights in the used wavelength range). The used central wavelength in this case is preferably a wavelength close to center of a visible range like a light having a wavelength of 550 nm for example, i.e. between 500 nm and 600 nm (preferably between 530 nm and 570 nm).

Figure 6:
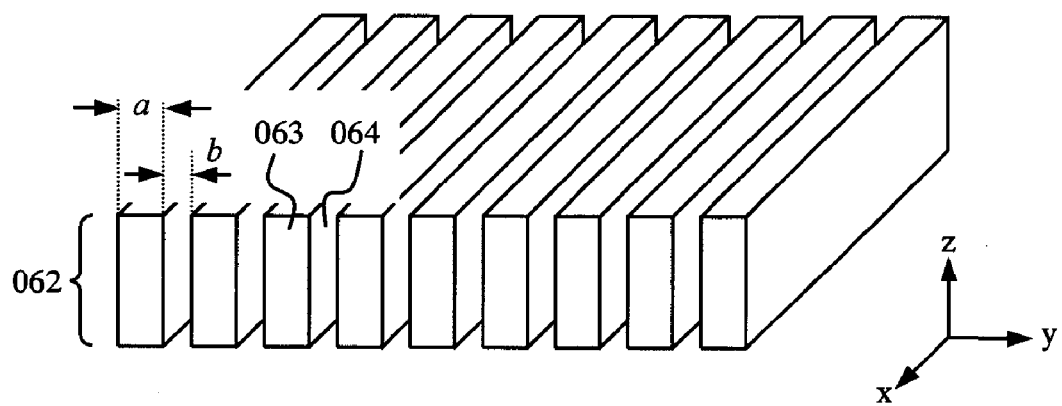
FIG. 6 is a schematic view of the optical element of the embodiment which includes a structural anisotropic layer.

FIG. 6 shows a structure example of a first layer having structural anisotropy. Reference numeral 062 denotes a layer having structural anisotropy (hereinafter, referred to as a structural anisotropic layer). The structural anisotropic layer 062 includes rectangular lattices made of materials 063 and rectangular lattices made of materials 064 different from the materials 063 which are alternately and periodically formed in a one-dimensional direction. The lattices made of the materials 063 and 064 constitute one structure smaller than the used central wavelength λ, and a plurality of these structures are formed in the structural anisotropic layer 062. The structures are homogeneous in the x and z directions, and periodic in the y direction. Reference code a denotes a width of the lattice made of the material 063, and reference code b denotes a width of the lattice made of the material 064 (interval between the lattices of the materials 063). The sum of a and b, i.e. a+b, is smaller than the used central wavelength λ.

In the structure smaller than a wavelength of incident light, the light behaves as if a homogeneous medium is present without being able to directly recognize the structure. In FIG. 6, the structural anisotropic layer 062 functions as a layer having a refractive index equivalent to that of a homogeneous film, and has characteristics according to the periodic structure.

A refractive index nx for polarized light where the x direction is a polarization direction and a refractive index ny for polarized light where the y direction is a polarization direction in the structural anisotropic layer 062 are represented by the following expressions (9) and (10), respectively, where n1 denotes a refractive index of the material 063 and n2 denotes a refractive index of the material 064.

$$n_x = \sqrt{\frac{an_1^2 + bn_2^2}{a+b}} \qquad (9)$$

$$n_y = \sqrt{\frac{a+b}{a/n_1^2 + b/n_2^2}} \qquad (10)$$

The expressions (9) and (10) are based on a method called a zero-dimensional effective refractive index method.

This method can obtain a refractive index of a structure anisotropic layer based on a material of the layer and its filling rate ff{=a/(a+b)}. Strictly, a structure interval, a used wavelength, or the like have influence, but the description thereof is omitted.

In order to provide the structure anisotropic layer 062 with high optical anisotropy, setting a large refractive index difference between the materials 063 and 064 constituting the structural anisotropic layer 062 is effective. Therefore, generally, a material of a high refractive index is used for the material 063, and air is used for the material 064. For example, when TiO2 (refractive index 2.3) is used for the material 063, and air (refractive index 1.0) is used for the material 064 to set a=b, nx is set to 1.77, and ny is set to 1.30, obtaining an extremely large refractive index difference.

This enables great reduction of a thickness of the structural anisotropic layer 062 to obtain a desired phase difference. For example, when the structural anisotropic layer 062 is used as a λ/4 plate and the used central wavelength λ is 550 nm, a thickness of the structural anisotropic layer 062 is 320 nm.

Although FIG. 6 shows an optical element where a plurality of rectangular lattices are periodically arrayed in a one-dimensional direction for easy description, the lattices may be periodically arrayed in a two-dimensional or three-dimensional direction. Each structure is not limited to the rectangular lattice, but a cylindrical or spherical lattice may be used. If one of the structures is smaller than the used central wavelength, the structures do not have to be arrayed periodically.

In the embodiment, an inorganic material may also be used as a medium having optical anisotropy. The inorganic material has high weather resistance and high heat resistance as compared with an organic material. Using the characteristics enables exhibition of sufficient performance even in an optical element used under a severe environment or temperature condition.

Hereinafter, specific embodiments will be described with reflectance characteristics at design values (experiment values) and an incident angle 0°. In each embodiment, a used wavelength range is 500 to 600 nm, and a used central wavelength is 550 nm. However, these are only examples, and the embodiments of the present invention are not limited to these conditions.

[Embodiment 1]

In Embodiment 1, a substrate having a refractive index of 1.75 is prepared, and an optical anisotropic layer is stacked on a surface of the substrate. Further, a thin film [1] having a refractive index of 1.38 and a physical film thickness (hereinafter, referred to also simply as a film thickness) of 100 nm is stacked on a surface of the optical anisotropic layer. Refractive indexes nx (nh) and ny (nl) of the optical anisotropic layer are respectively 2.05 and 1.72. A film thickness of the optical anisotropic layer is 400 nm. In the embodiment, a first medium adjacent to the optical anisotropic layer is a substrate and a second medium is a thin film layer [1].

An incident medium is an air and a refractive index of the air is 1.00. The same incident medium is applied to other embodiments described later. The optical element of the present embodiment satisfies conditions represented by the expressions (1) to (4).

Figure 7:
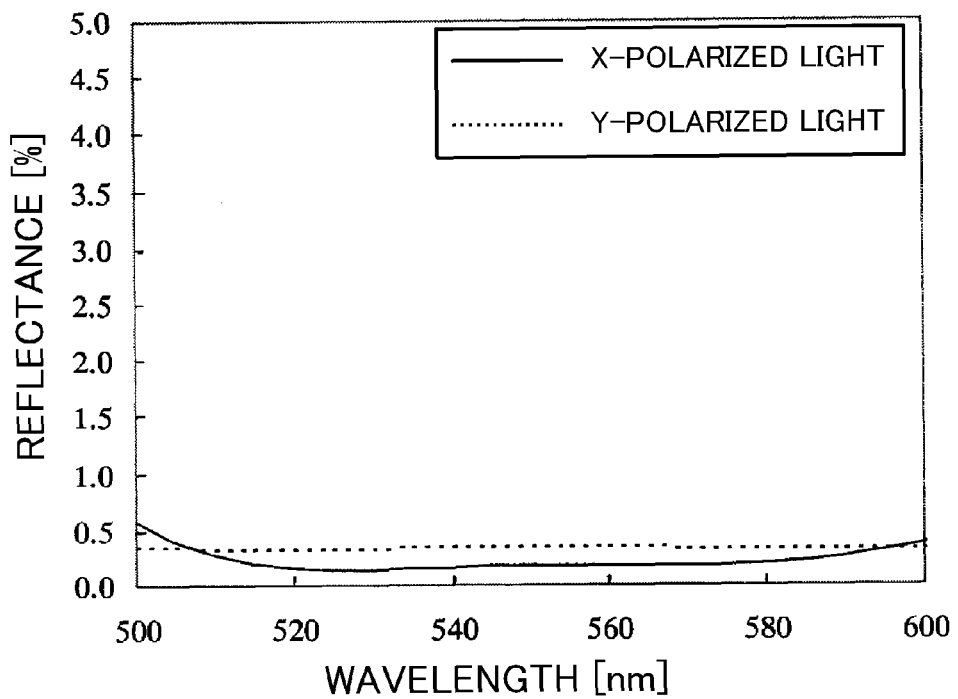
FIG. 7 is a view showing reflectance characteristics of an optical element of Embodiment 1.

FIG. 7 shows reflectance characteristics of the optical element of the present embodiment. As shown in FIG. 7, reflectances are sufficiently reduced for both polarized lights (x-polarized and y-polarized lights) at a wavelength between 500 and 600 nm.

[Embodiment 2]

In Embodiment 2, a substrate having a refractive index of 1.80 is prepared, and a thin film layer [3] (first medium) having a refractive index of 2.10 and a film thickness of 131 nm is stacked on a surface of the substrate. An optical anisotropic layer is stacked on a surface of the thin film [3]. Further, a thin film layer [1] (second medium) having a refractive index of 1.38 and a film thickness of 100 nm is stacked on a surface of the optical anisotropic layer. The optical anisotropic layer is configured by arraying a plurality of lattices (a refractive index of 2.4) which are smaller than the used central wavelength in a one-dimensional direction. A filling rate is 0.88. Refractive indexes nx (nh) and ny (nl) of the optical anisotropic layer are respectively 2.28 and 1.90. A film thickness of the optical anisotropic layer is 362 nm. The optical element of the present embodiment satisfies the conditions represented by the expressions (1) to (4).

Figure 8:
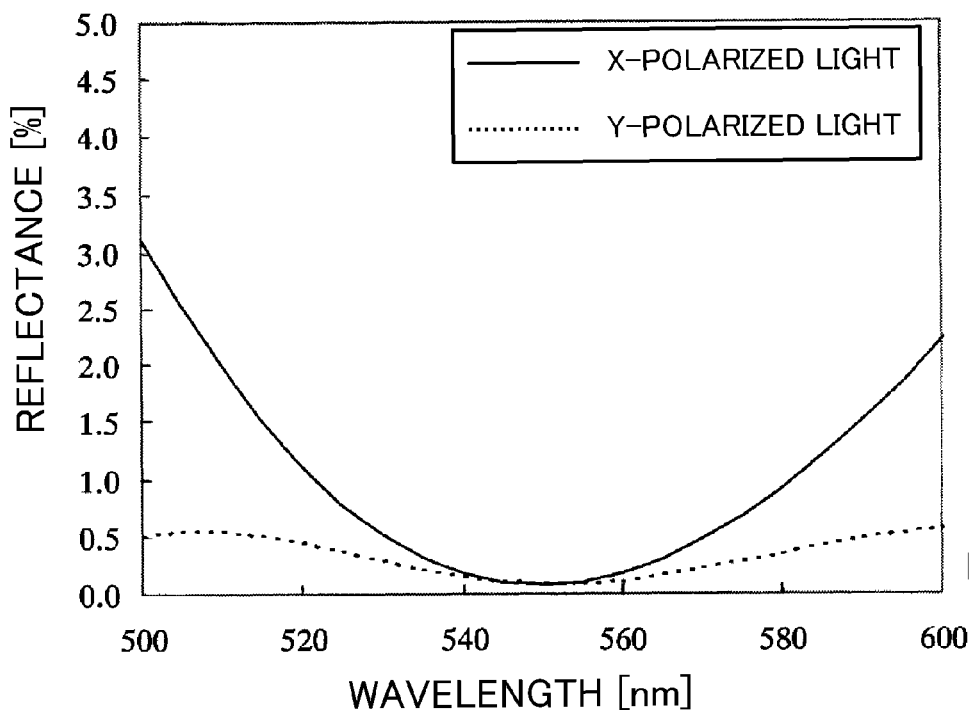
FIG. 8 is a view showing reflectance characteristics of an optical element of Embodiment 2.

FIG. 8 shows reflectance characteristics of the optical element of the present embodiment. As shown in FIG. 8, reflectances show a minimal value and are sufficiently reduced for both polarized lights (x-polarized and y-polarized lights) at a used central wavelength of 550 nm.

[Embodiment 3]

In Embodiment 3, a substrate having a refractive index of 2.0 is prepared, and a thin film [3] (first medium) having a refractive index of 1.80 and a film thickness of 87 nm is stacked on a surface of the substrate. An optical anisotropic layer is stacked on a surface of the thin film layer [3]. Further, a thin film layer [1] (second medium) having a refractive index of 1.38 and a film thickness of 100 nm is stacked on a surface of the optical anisotropic layer. Refractive indexes nx (nh) and ny (nl) of the optical anisotropic layer are respectively 1.85 and 1.70. A film thickness of the optical anisotropic layer is 890 nm. The optical element of the present embodiment satisfies the conditions represented by the expressions (1) to (4).

Figure 9:
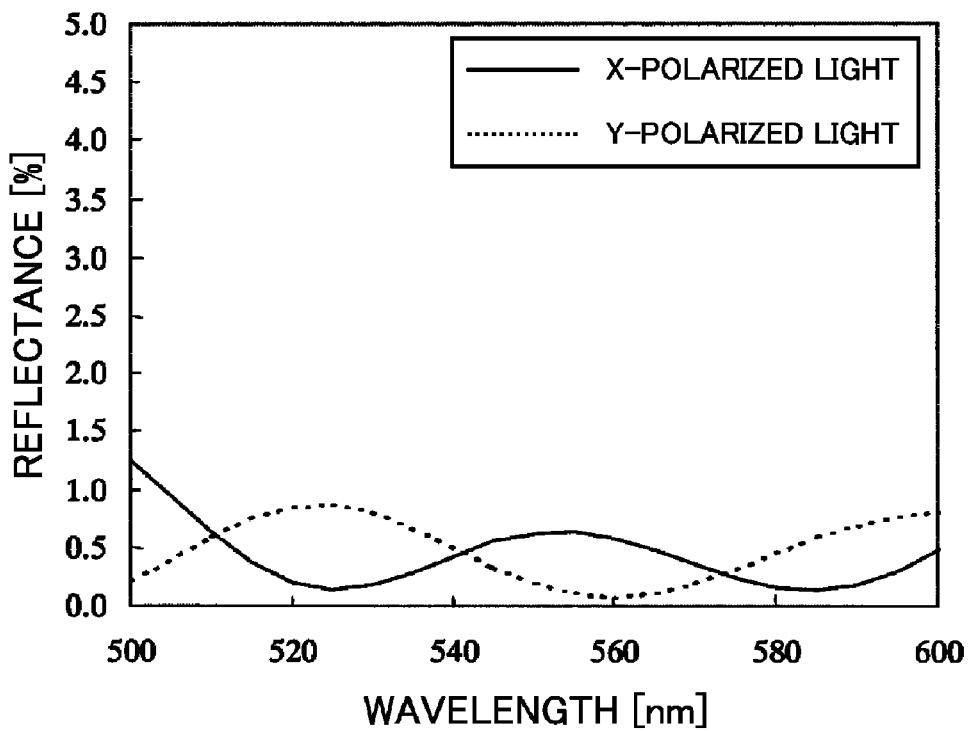
FIG. 9 is a view showing reflectance characteristics of an optical element of Embodiment 3.

FIG. 9 shows reflectance characteristics of the optical element of the present embodiment. As shown in FIG. 9, reflectances are sufficiently reduced and are balanced for both polarized lights at a wavelength between 500 and 600 nm.

[Embodiment 4]

In Embodiment 4, a substrate having a refractive index of 1.53 is prepared, and a thin film layer [3] having a refractive index of 1.78 and a film thickness of 78 nm is stacked on a surface of the substrate. A thin film layer [2] (second medium) having a refractive index of 2.00 and a film thickness of 133 nm is stacked on a surface of the thin film layer [3], and an optical anisotropic layer is stacked on a surface of the thin film layer [2]. Further, a thin film layer [1] (first medium) having a refractive index of 1.38 and a film thickness of 100 nm is stacked on a surface of the optical anisotropic layer. Refractive indexes nx (nh) and ny (nl) of the optical anisotropic layer are respectively 2.11 and 1.90. A film thickness of the optical anisotropic layer is 651 nm. The optical element of the present embodiment satisfies the conditions represented by the expressions (1) to (4).

Figure 10:
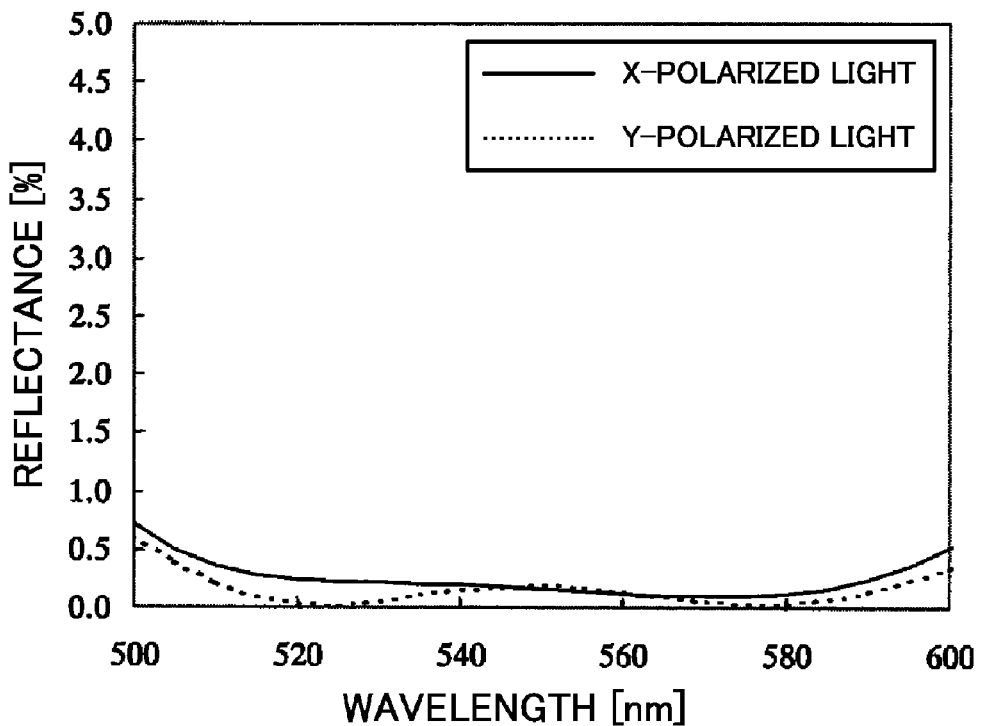
FIG. 10 is a view showing reflectance characteristics of an optical element of Embodiment 4.

FIG. 10 shows reflectance characteristics of the optical element of the present embodiment. As shown in FIG. 10, reflectances are sufficiently reduced for both polarized lights at a wavelength between 500 and 600 nm.

[Embodiment 5]

In Embodiment 5, a substrate having a refractive index of 1.53 is prepared, and a thin film layer [3] (second medium) having a refractive index of 1.78 and a film thickness of 76 nm is stacked on a surface of the substrate. An insertion layer (third medium) having a refractive index of 2.30 and a film thickness of 10 nm is stacked on a surface of the thin film layer [3], and an optical anisotropic layer is stacked on a surface of the insertion layer. Further, a thin film layer [1] (first medium) having a refractive index of 1.38 and a film thickness of 100 nm is stacked on a surface of the optical anisotropic layer. Refractive indexes nx (nh) and ny (nl) of the optical anisotropic layer are respectively 2.11 and 1.90. A film thickness of the optical anisotropic layer is 651 nm. In the present embodiment, an optical film thickness of the insertion layer adjacent to the optical anisotropic layer at the substrate side is an extremely small value of 23 nm. Accordingly, the thin film layer [3] (second medium) can be considered to be optically adjacent to the optical anisotropic layer. The optical element of the present embodiment satisfies the conditions represented by the expressions (1) to (5).

Figure 11:
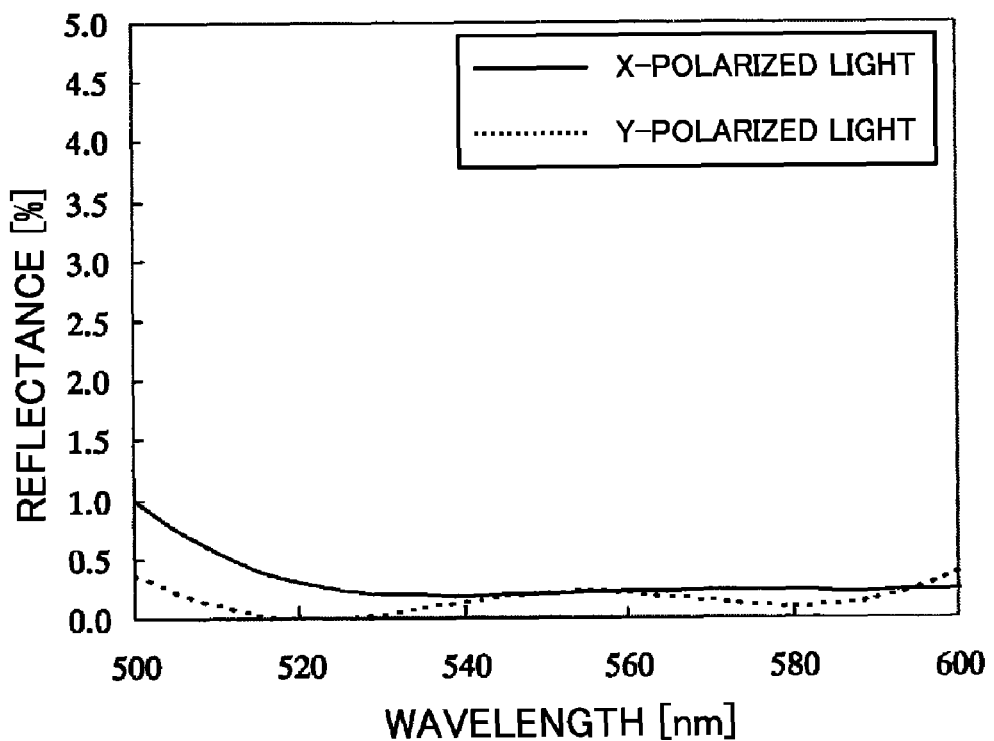
FIG. 11 is a view showing reflectance characteristics of an optical element of Embodiment 5.

FIG. 11 shows reflectance characteristics of the optical element of the present embodiment. As shown in FIG. 11, reflectances are sufficiently reduced for both polarized lights at a wavelength between 500 and 600 nm.

Table 1 collectively shows whether the numerical values and the conditions of Embodiments 1 to 5 are satisfied (o). In Table 1, *1 indicates that a calculation is performed by assuming that the thin film layer [3] having a refractive index of 1.78 and a film thickness of 76 nm is optically adjacent to the optical anisotropic layer.

TABLE 1

| # | EMBODIMENT 1 REFRACTIVE INDEX | PHYSICAL FILM THICKNESS | EMBODIMENT 2 REFRACTIVE INDEX | PHYSICAL FILM THICKNESS | EMBODIMENT 3 REFRACTIVE INDEX | PHYSICAL FILM THICKNESS | EMBODIMENT 4 REFRACTIVE INDEX | PHYSICAL FILM THICKNESS | EMBODIMENT 5 REFRACTIVE INDEX | PHYSICAL FILM THICKNESS |
|---|---|---|---|---|---|---|---|---|---|---|
| INCIDENT MEDIUM | 1.00 | | 1.00 | | 1.00 | | 1.00 | | 1.00 | |
| THIN FILM LAYER [1] | 1.38 | 100 | 1.38 | 100 | 1.38 | 100 | 1.38 | 100 | 1.38 | 100 |
| OPTICAL ANISOTROPIC | 2.05 1.72 | 400 | 2.28 1.90 | 362 | 1.85 1.70 | 890 | 2.11 1.90 | 651 | 2.11 1.90 | 651 |

TABLE 1-continued

| # | EMBODIMENT 1 REFRACTIVE INDEX | EMBODIMENT 1 PHYSICAL FILM THICKNESS | EMBODIMENT 2 REFRACTIVE INDEX | EMBODIMENT 2 PHYSICAL FILM THICKNESS | EMBODIMENT 3 REFRACTIVE INDEX | EMBODIMENT 3 PHYSICAL FILM THICKNESS | EMBODIMENT 4 REFRACTIVE INDEX | EMBODIMENT 4 PHYSICAL FILM THICKNESS | EMBODIMENT 5 REFRACTIVE INDEX | EMBODIMENT 5 PHYSICAL FILM THICKNESS |
|---|---|---|---|---|---|---|---|---|---|---|
| INSERTION LAYER | | | | | | | | | 2.30 | 10 |
| THIN FILM LAYER [2] | | | | | | | 2.00 | 133 | | |
| THIN FILM LAYER [3] | | | 2.10 | 131 | 1.80 | 87 | 1.78 | 76 | 1.78 | 76 |
| SUBSTRATE | 1.75 | | 1.80 | | 2.00 | | 1.53 | | 1.53 | |
| CONDITION (1) | ○ | | ○ | | ○ | | ○ | | ○ *1 | |
| CONDITION (2) | ○ | | ○ | | ○ | | ○ | | ○ *1 | |
| CONDITION (3), (4) | 3λ/2 ○ | | 3λ/2 ○ | | 6λ/2 ○ | | 5λ/2 ○ | | 5λ/2 ○ *1 | |
| CONDITION (5) | ... | | ... | | ... | | ... | | λ/25 ○ | |

*1 It is assumed that a thin film layer [3] is adjacent to an optical anisotropic layer.

Hereinafter, Comparative Examples 1 and 2 corresponding to Embodiments 1 to 5 will be described. These Comparative Examples, as shown in Table 2, do not satisfy (x) the condition represented by the expression (1).

COMPARATIVE EXAMPLE 1

In Comparative Example 1, a substrate having a refractive index of 1.80 is prepared, and an optical anisotropic layer is stacked on a surface of the substrate. Further, a thin film [1] having a refractive index of 1.38 and a film thickness of 100 nm is stacked on a surface of the optical anisotropic layer. The optical anisotropic layer is constituted by arraying a plurality of lattices smaller than the used central wavelength in a one-dimensional direction. A filling rate is 0.80. Refractive indexes nx (nh) and ny (nl) of the optical anisotropic layer are respectively 1.67 and 1.50. A physical film thickness of the optical anisotropic layer is 825 nm. The optical element of Comparative Example 1 does not satisfy the condition represented by the expression (1).

Figure 12:
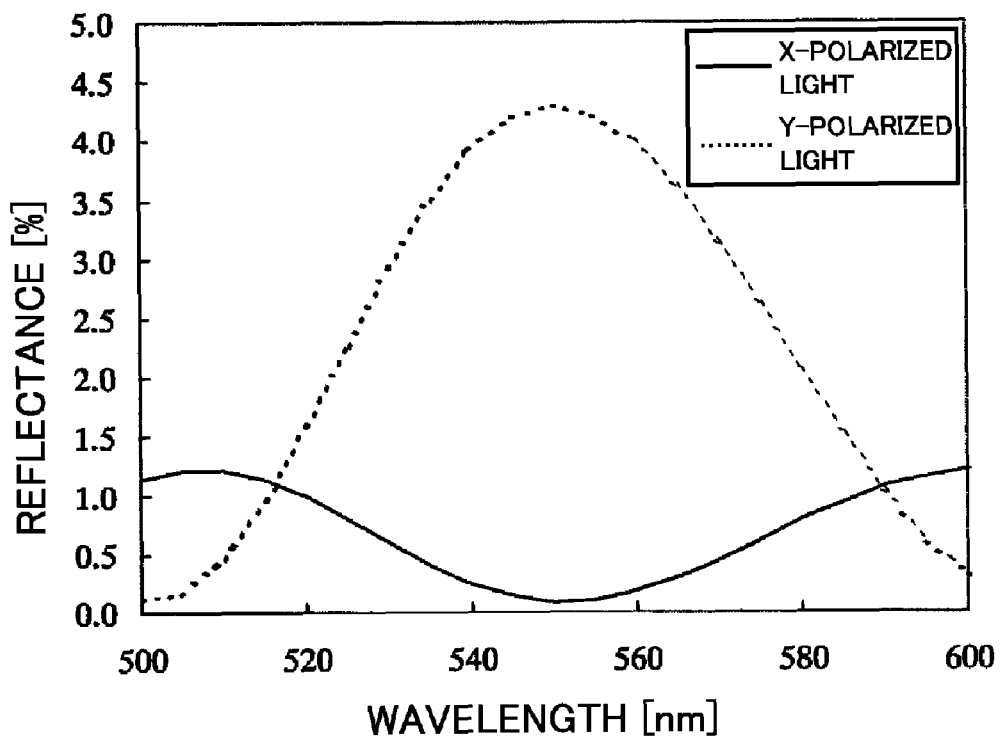
FIG. 12 is a view showing reflectance characteristics of an optical element of Comparative Example 1.

FIG. 12 shows reflectance characteristics of Comparative Example 1. As shown in FIG. 12, in Comparative Example 1, in order to prevent reflection, a thin film layer having a low refractive index is stacked at a light incident side. However, since relationships of the refractive indexes or the film thicknesses are not appropriately set, reflectances are greatly different between both polarized lights, and particularly a reflectance for the y-polarized light is high.

COMPARATIVE EXAMPLE 2

In Comparative Example 2, a substrate having a refractive index of 1.53 is prepared, and a thin film layer [3] having a refractive index of 2.30 and a film thickness of 120 nm is stacked on a surface of the substrate. An optical anisotropic layer is stacked on a surface of the thin film layer [3]. Further, a thin film layer [1] having a refractive index of 1.38 and a film thickness of 100 nm is stacked on a surface of the optical anisotropic layer. The optical anisotropic layer is constituted by arraying a plurality of lattices (refractive index of 2.3) smaller than the used central wavelength in a one-dimensional direction. A filling rate is 0.80. Refractive indexes nx (nh) and ny (nl) of the optical anisotropic layer are respectively 2.11 and 1.69. A film thickness of the optical anisotropic layer is 325 nm. The optical element of Comparative Example 2 does not satisfy the condition represented by the expression (1).

Figure 13:
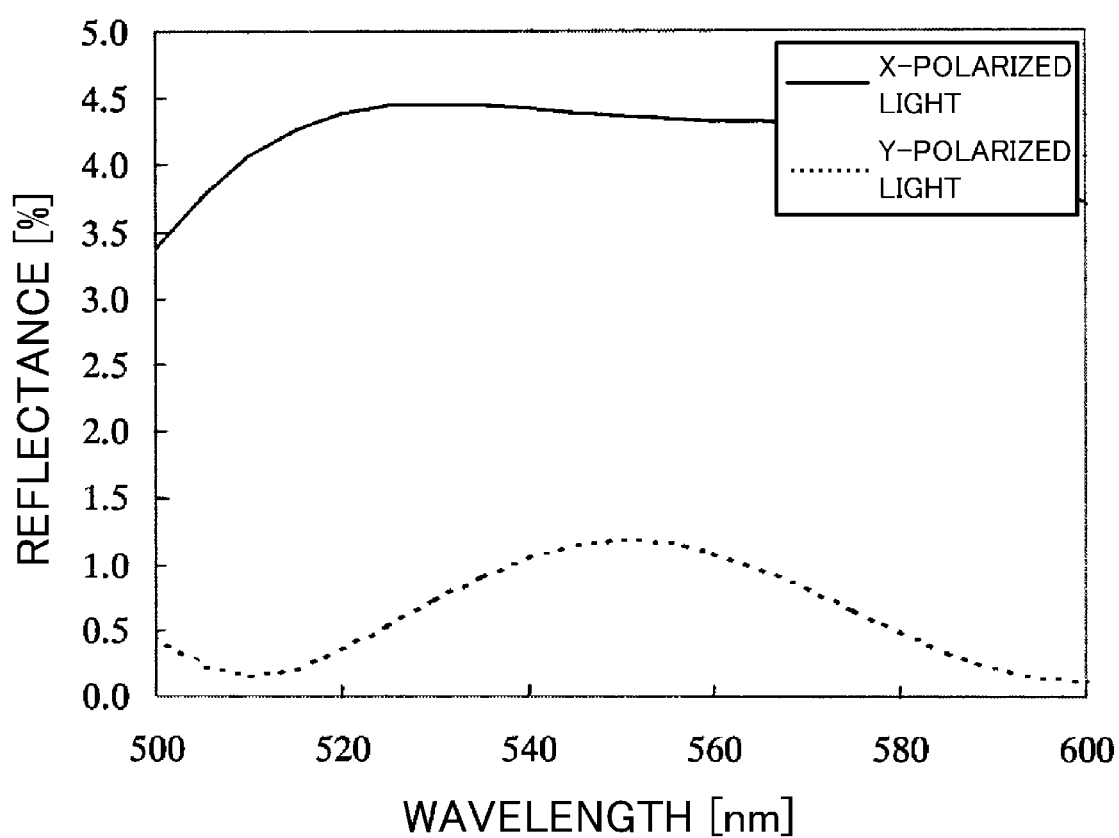
FIG. 13 is a view showing reflectance characteristics of the optical element of Comparative Example 2.

FIG. 13 shows reflectance characteristics of Comparative Example 2. As shown in FIG. 13, the thin film layers are stacked on both interfaces of the optical anisotropic layer. However, since the reflectance for the x-polarized light is high, no antireflection function is provided.

TABLE 2

| # | COMPARATIVE EXAMPLE 1 REFRACTIVE INDEX | COMPARATIVE EXAMPLE 1 PHYSICAL FILM THICKNES | COMPARATIVE EXAMPLE 2 REFRACTIVE INDEX | COMPARATIVE EXAMPLE 2 PHYSICAL FILM THICKNES |
|---|---|---|---|---|
| INCIDENT MEDIUM | 1.00 | | 1.00 | |
| THIN FILM LAYER [1] | 1.38 | 100 | 1.38 | 100 |

TABLE 2-continued

|  | COMPARATIVE EXAMPLE 1 | | COMPARATIVE EXAMPLE 2 | |
| --- | --- | --- | --- | --- |
| # | REFRACTIVE INDEX | PHYSICAL FILM THICKNES | REFRACTIVE INDEX | PHYSICAL FILM THICKNES |
| THIN FILM LAYER [2] | | | | |
| OPTICAL ANISOTROPIC | 1.67 1.50 | 825 | 2.11 1.69 | 325 |
| INSERTION LAYER | | | | |
| THIN FILM LAYER [3] | | | 2.30 | 120 |
| SUBSTRATE | 1.80 | | 1.53 | |
| CONDITION (1) | X | | X | |
| CONDITION (2) | ... | | ... | |
| CONDITION (3), (4) | ... | | ... | |
| CONDITION (5) | ... | | ... | |

[Embodiment 6]

Hereinafter, a liquid crystal projector and an optical pickup apparatus will be described as examples of an optical apparatus which use the optical element of any one of Embodiments 1 to 5. However, the optical element of each Embodiment can also be used for other optical apparatuses.

Figure 14:
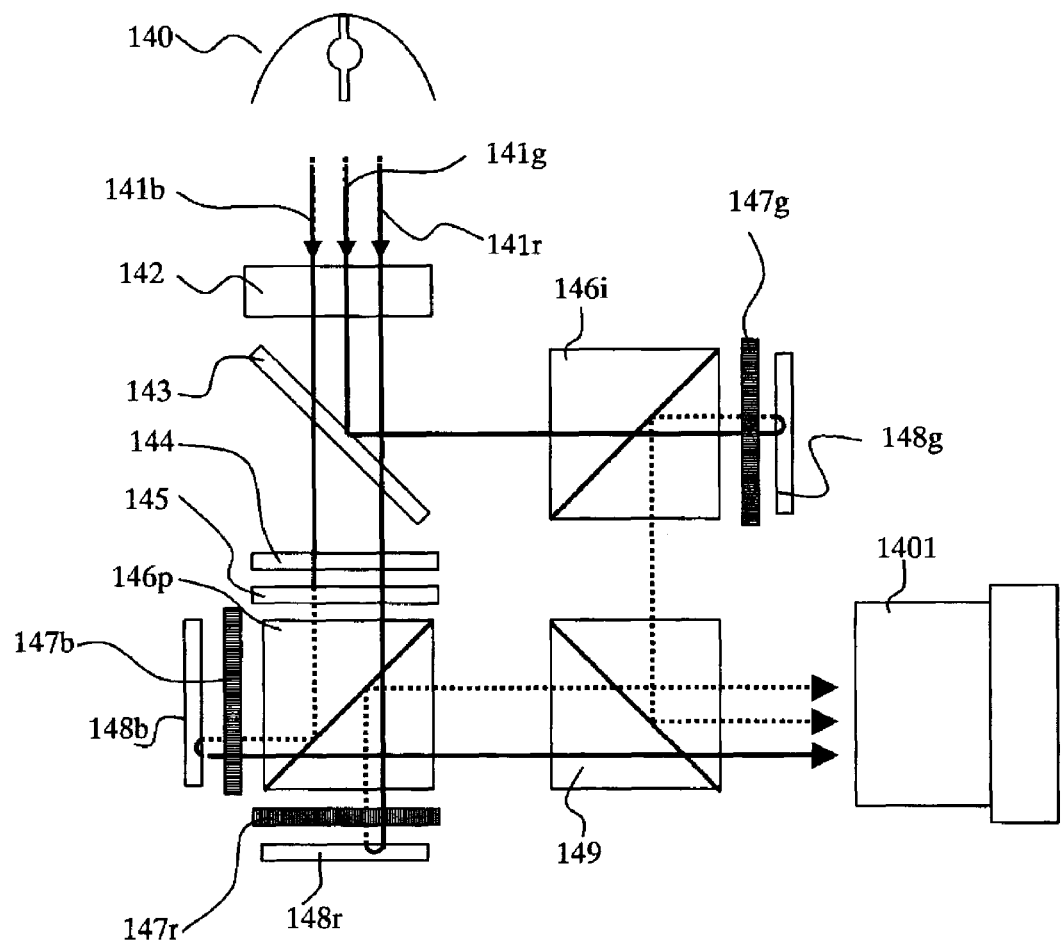
FIG. 14 is a view showing a configuration of a liquid crystal projector which uses the optical elements of any of Embodiments 1 to 5.

FIG. 14 shows a configuration of a liquid crystal projector. Reference numeral 140 denotes a light source (lamp), reference numeral 141r denotes an optical path of a red light, reference numeral 141g denotes an optical path of a green light, and a reference numeral 141b denotes an optical path of a blue light. Reference numeral 142 denotes a polarization conversion element, and reference numeral 143 denotes a dichroic mirror. Reference numeral 144 denotes a polarization plate, and reference numeral 145 denotes a wavelength-selective phase plate (a wavelength-selective phase difference plate).

Reference numeral 146i denotes a green polarization beam splitter, and reference numeral 146p denotes a blue and red polarization beam splitter. Reference numerals 147r, 147g, and 147b respectively denote red, green and blue 1/4λ plates. Reference numerals 148r, 148g, and 148b respectively denote red, green, and blue reflective liquid crystal panels (image forming elements). Reference numeral 149 denotes a color synthesis prism, and reference numeral 1401 denotes a projection lens.

A light beam from the light source 140 is converted into a light beam having a specific polarization direction by the polarization conversion element 142. The polarized light beam is converted for each color into a P-polarized or S-polarized light by the wavelength-selective phase plate 145 and 1/4λ plates 147r, 147g and 147b, and reflected by or transmitted through the polarization beam splitters 146i and 146p. Thus, each color light projected through a corresponding optical path to a projected surface such as a screen (not shown) by the projection lens 1401 to form a color image on the projected surface. The wavelength-selective phase plate is an optical element which provides a phase difference by functioning as a phase plate (a phase difference plate) for one colored light among red, green, and blue colors in a visible range, and has a function that does not provide a substantial phase difference for other colored lights.

The optical elements of Embodiments 1 to 5 can be used as the wavelength-selective phase plate 145 and the 1/4λ plates (phase plates) 147r, 147g, and 147b. The optical elements (phase plates) of embodiments 1 to 5 may also be used as any one of the wavelength-selective phase plate 145 and the 1/4λ plates (phase plates) 147r, 147g, and 147b.

The optical elements of Embodiments 1 to 5 can be miniaturized since their thicknesses can be reduced, and high transmittances can be realized as the phase plates for entering P-polarized and S-polarized lights. As a result, a high-performance projector can be provided. The use of the inorganic material for the first layer of the optical element enables realization of a projector of high heat resistance and high weather resistance.

Figure 15:
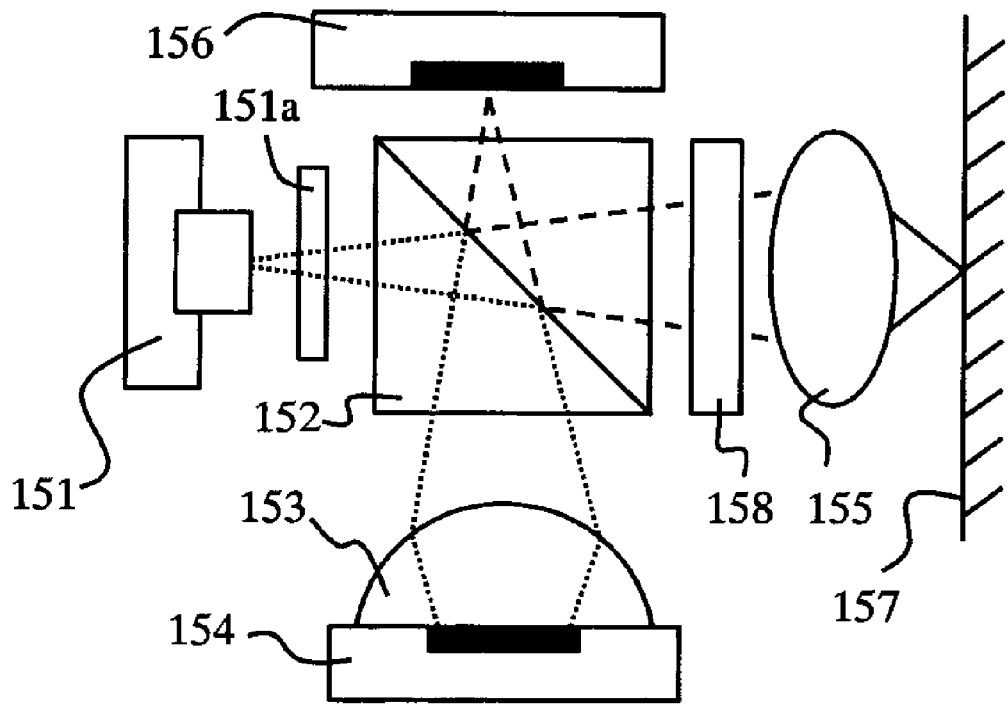
FIG. 15 is a view showing a configuration of an optical pickup apparatus which uses the optical element of any of Embodiments 1 to 5.

FIG. 15 shows an optical system around a light source in an optical disk optical pickup apparatus. Reference numeral 151 denotes a light source (laser), and reference numeral 151a denotes a polarization plate. Reference numeral 152 denotes a polarization beam splitter, and reference numerals 153 and 155 denote condenser lenses, and reference numerals 154 and 156 denote photodetectors. Reference numeral 157 denotes an optical disk, and reference numeral 158 denotes a phase plate.

A light beam from the light source 151 enters the polarization beams splitter 152 as a light beam (P-polarized light) having a specific polarization direction by the polarization plate 151a. A part of the polarized light beam is reflected by the polarization beam splitter 152 to be monitored by the photodetector 154 via the condenser lens 153.

The polarized light beam transmitted through the polarization beam splitter 152 forms an image on the optical disk 157 by the condenser lens 155 via the phase plate 158. The reflected light optically modulated at the optical disk 157 has its polarization direction rotated by 90° by the phase plate 158 to become an S-polarized light, and is reflected by the polarization beam splitter 152. Then, the reflected light is detected by the photodetector 156 for detecting a reproduced signal light.

The optical elements of Embodiments 1 to 5 can be used for the phase plate 158. The optical elements of Embodiments 1 to 5 can be miniaturized because their thicknesses can be reduced, and high transmittances can be realized as a phase plate for entering P-polarized and S-polarized lights. As a result, a high-performance optical pickup apparatus can be provided. The use of the inorganic layer for the first layer of the optical element enables realization of an optical pickup apparatus of high heat resistance and high weather resistance.

According to each of the above embodiments, the optical anisotropic medium layer can function as an interference layer because a thin layer of the optical anisotropic medium can be formed when the optical anisotropic medium is used. Further, when refractive indexes and thicknesses of the optical anisotropic medium layer and a medium (layer) optically adjacent to the optical anisotropic medium is set to be an appropriate range, an optical element having good antireflection performance and good reflection-transmission characteristics for each polarized light can be realized even if a medium having high optical anisotropy is used. An optical apparatus with high performance can be provided by using the optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-237288, filed on Sep. 17, 2008, which is hereby incorporated by reference herein in its entirety.

What is claimed is:

1. An optical element comprising:
an optical anisotropic medium;
a first optical isotropic medium; and
a second optical isotropic medium,
wherein the optical anisotropic medium is disposed between the first and second optical isotropic media,
wherein the optical anisotropic medium consists of one material,
wherein a difference between a minimum refractive index $n_l$ and a maximum refractive index $n_h$ of the optical anisotropic medium at a wavelength between 500 nm and 600 nm is at least 0.1, and
wherein, when a refractive index of the first optical isotropic medium at the wavelength is defined as $n_{t1}$, a refractive index of the second optical isotropic medium at the wavelength is defined as $n_{t2}$, and a thickness of the optical anisotropic medium is defined as d, the optical element satisfies the following conditions:

$$(n_{t1}-n_l) \cdot (n_{t1}-n_h) \leq 0,$$

$$(n_{t2}-n_l) \cdot (n_{t2}-n_h) \geq 0, \text{ and}$$

$$362 \text{ nm} \leq d \leq 890 \text{ nm}.$$

2. The optical element according to claim 1, further comprising:
a third optical isotropic medium disposed between the first optical isotropic medium and the optical anisotropic medium,
wherein the following condition is satisfied:

$$0 \leq n_{o1} \cdot d_{o1} \leq \frac{\lambda}{6},$$

where $n_{o1}$ is a refractive index of the third optical isotropic medium at the wavelength, $d_{o1}$ is a thickness of the third optical isotropic medium, and $\lambda$ is the wavelength.

3. The optical element according to claim 1, further comprising:
a fourth optical isotropic medium disposed between the second optical isotropic medium and the optical anisotropic medium,
wherein the following condition is satisfied:

$$0 \leq n_{o2} \cdot d_{o2} \leq \frac{\lambda}{6},$$

where $n_{o2}$ is a refractive index of the fourth optical isotropic medium at the wavelength, $d_{o2}$ is a thickness of the fourth optical isotropic medium, and $\lambda$ is the wavelength.

4. The optical element according to claim 1, wherein the optical element is a phase plate.

5. The optical element according to claim 1, wherein the optical element satisfies the following conditions:

$$1.85 \leq n_h \leq 2.28, \text{ and}$$

$$1.70 \leq n_l \leq 1.90.$$

6. The optical element according to claim 1, wherein, when a thickness of the second optical isotropic medium is defined as $d_2$, the optical element satisfies the following condition:

$$76 \text{ nm} \leq d_2 \leq 133 \text{ nm}.$$

7. An optical apparatus comprising:
an optical element including:
an optical anisotropic medium;
a first optical isotropic medium; and
a second optical isotropic medium,
wherein the optical anisotropic medium is disposed between the first and second optical isotropic media,
wherein the optical anisotropic medium consists of one material,
wherein a difference between a minimum refractive index $n_l$ and a maximum refractive index $n_h$ of the optical anisotropic medium at a wavelength between 500 nm and 600 nm is at least 0.1, and
wherein, when a refractive index of the first optical isotropic medium at the wavelength is defined as $n_{t1}$, a refractive index of the second optical isotropic medium at the wavelength is defined as $n_{t2}$, and a thickness of the optical anisotropic medium is defined as d, the optical element satisfies the following conditions:

$$(n_{t1}-n_l) \cdot (n_{t1}-n_h) \leq 0,$$

$$(n_{t2}-n_l) \cdot (n_{t2}-n_h) \geq 0, \text{ and}$$

$$362 \text{ nm} \leq d \leq 890 \text{ nm}.$$

8. An optical element comprising:
a structural anisotropy layer;
a first optical isotropic layer; and
a second optical isotropic layer,
wherein the structural anisotropy layer is disposed between the first optical isotropic layer and the second optical isotropic layer,
wherein the structural anisotropy layer consists of two materials,
wherein a difference between a minimum refractive index $n_l$ and a maximum refractive index $n_h$ of the structural anisotropic layer at a wavelength between 500 nm and 600 nm is at least 0.1, and
wherein, when a refractive index of the first optical isotropic layer at the wavelength is defined as $n_{t1}$, a refractive index of the second optical isotropic layer at the wavelength is defined as $n_{t2}$, and a thickness of the structural anisotropy layer is defined as d, the optical element satisfies the following conditions:

$(n_{t1}-n_l) \cdot (n_{t1}-n_h) \leq 0$, $(n_{t2}-n_l) \cdot (n_{t2}-n_h) \geq 0$, and $362 \text{ nm} \leq d \leq 890 \text{ nm}$.

9. The optical element according to claim 8, wherein the structural anisotropy layer has a structure which includes rectangular lattices made of a material and the rectangular lattices are arrayed in a one-dimensional direction, and
wherein the maximum refractive index $n_h$ is a refractive index of the structural anisotropy layer for light vibrating in a direction perpendicular to the one-dimensional direction and the minimum refractive index $n_l$ is a refractive index of the structural anisotropy layer for light vibrating in the one-dimensional direction.

10. The optical element according to claim 8, further comprising:
a third optical isotropic layer disposed between the first optical isotropic layer and the structural anisotropy layer,
wherein the following condition is satisfied:

$$0 \leq n_{o1} \cdot d_{o1} \leq \frac{\lambda}{6},$$

where $n_{o1}$ is a refractive index of the third optical isotropic layer at the wavelength, $d_{o1}$ is a thickness of the third optical isotropic layer, and $\lambda$ is the wavelength.

11. An optical element according to claim 8, further comprising a fourth optical isotropic layer disposed between the second optical isotropic layer and the structural anisotropy layer,
wherein the following condition is satisfied:

$$0 \leq n_{o2} \cdot d_{o2} \leq \frac{\lambda}{6},$$

where $n_{o2}$ is a refractive index of the fourth optical isotropic layer at the wavelength, $d_{o2}$ is a thickness of the fourth optical isotropic layer, and $\lambda$ is the wavelength.

12. The optical element according to claim 8, wherein the optical element is a phase plate.

13. The optical element according to claim 8, wherein the optical element satisfies the following conditions:

$1.85 \leq n_h \leq 2.28$, and $1.70 \leq n_l \leq 1.90$.

14. The optical element according to claim 8, wherein, when a thickness of the second optical isotropic layer is defined as $d_2$, the optical element satisfies the following condition:

$76 \text{ nm} \leq d_2 \leq 133 \text{ nm}$.

15. An optical apparatus comprising an optical element, the optical element including:
a structural anisotropy layer;
a first optical isotropic layer; and
a second optical isotropic layer,
wherein the structural anisotropy layer is disposed between the first optical isotropic layer and the second optical isotropic layer,
wherein the structural anisotropy layer consists of two materials,
wherein a difference between a minimum refractive index $n_l$ and a maximum refractive index $n_h$ of the structural anisotropy layer at a wavelength between 500 nm and 600 nm is at least 0.1, and
wherein, when a refractive index of the first optical isotropic layer at the wavelength is defined as $n_{t1}$, a refractive index of the second optical isotropic layer at the wavelength is defined as $n_{t2}$, and a thickness of the structural anisotropy layer is defined as d, the optical element satisfies the following conditions:

$(n_{t1}-n_l) \cdot (n_{t1}-n_h) \leq 0$ $(n_{t2}-n_l) \cdot (n_{t2}-n_h) \geq 0$, and $362 \text{ nm} \leq d \leq 890 \text{ nm}$.

* * * * *